(12) United States Patent
Toschi

(10) Patent No.: US 7,450,575 B2
(45) Date of Patent: Nov. 11, 2008

(54) LOW REDUNDANCY DATA RAM ARCHITECTURE FOR MONOLITHIC TIME-SPACE SWITCHES

(75) Inventor: Valentino Toschi, Milan (IT)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 660 days.

(21) Appl. No.: 11/058,409

(22) Filed: Feb. 16, 2005

(65) Prior Publication Data

US 2005/0185641 A1  Aug. 25, 2005

(30) Foreign Application Priority Data

Feb. 17, 2004  (EP)  ................... 04003496

(51) Int. Cl.
*H04Q 11/00*  (2006.01)
(52) U.S. Cl. .................................... 370/369
(58) Field of Classification Search .......... 370/369–380
See application file for complete search history.

(56) References Cited

U.S. PATENT DOCUMENTS

| | | | | |
|---|---|---|---|---|
| 4,470,139 A | * | 9/1984 | Munter | 370/363 |
| 4,667,320 A | * | 5/1987 | Onno et al. | 370/380 |
| 5,168,492 A | * | 12/1992 | Beshai et al. | 370/353 |
| 5,784,369 A | * | 7/1998 | Romiti et al. | 370/358 |
| 6,307,852 B1 | * | 10/2001 | Fisher et al. | 370/352 |
| 6,704,307 B1 | * | 3/2004 | Graves et al. | 370/372 |
| 6,876,649 B1 | * | 4/2005 | Beshai | 370/355 |
| 7,099,583 B2 | * | 8/2006 | Schafer et al. | 398/56 |
| 2003/0053417 A1 | | 3/2003 | Munter et al. | |
| 2003/0137977 A1 | * | 7/2003 | Suzaki | 370/360 |

FOREIGN PATENT DOCUMENTS

| | | | |
|---|---|---|---|
| EP | 0 453 129 A1 | | 10/1991 |
| EP | 1073309 | * | 7/2000 |
| SU | 982089 | * | 12/1982 |

\* cited by examiner

*Primary Examiner*—Hassan Kizou
*Assistant Examiner*—Mounir Moutaouakil
(74) *Attorney, Agent, or Firm*—McGinn IP Law Group, PLLC

(57) ABSTRACT

A non-blocking time and space switch is provided, based on specific memory method functions, called replica representatives, which shows a much lower data redundancy compared with the common RAM based approach as a consequence of multiple replica representatives. This allows the monolithic implementation of high through put time space switches.

19 Claims, 4 Drawing Sheets

| $N_{RP}$ | Max $N_{CH}$ | | |
|---|---|---|---|
| | $N_T = 1$ | $N_T = 2$ | $N_T = 3$ |
| 1 | 1 | | |
| 2 | 2 | 5 | |
| 3 | 3 | 9 | 13 |
| 4 | 4 | 18 | 22 |
| 5 | 5 | 27 | 35 |
| 6 | 6 | 39 | 50 |
| 7 | 7 | 52 | 67 |
| 8 | 8 | 68 | 88 |
| 9 | 9 | 85 | 111 |
| 10 | 10 | 105 | 136 |
| 11 | 11 | 126 | 165 |
| 12 | 12 | 150 | 196 |
| | STD | LRDR | |

LOW REDUNDANCY DATA RAM ARCHITECTURE FOR MONOLITHIC TIME-SPACE SWITCHES

FIELD OF THE INVENTION

The invention relates to an implementation of monolithic non-blocking time-space synchronous switches, which can be used for e.g. SONET/SDH Cross Connects, Add/Drop Multiplexers and generic synchronous transparent Crosspoint Switches for packet switching.

BACKGROUND OF THE INVENTION

Monolithic switching devices, using both time and space switching, are the crucial components to build large digital Cross Connects. A given switch can have a number of physical channels $N_{CH}$, each carrying a number of time-slots $N_{TS}$. If each time slot in each output channel can carry data drawn from any time-slot of any of the input channels, the switch is fully non-blocking. The typical implementations of the time-space switch are two: Mux-based and RAM-based. As far as Mux-based switches are concerned, the limitation, in case of high throughput switches, is mainly due to the huge number of connections which cause drastic routing congestion in design layout. The advantage of a RAM-based architecture is the reduction of the number of connections in the switch design by the means of redundant memory elements; however, the limitation in this latter case is the huge quantity of RAM.

In a RAM-based switch the interchangeable data, consisting of $(N_{CH}*N_{TS})$ time-slots, are sequentially written in a data matrix D (DM1) with $N_C$ columns and $N_R$ rows: obviously $N_C*N_R \geq N_{CH}*N_{TS}$. Physically, each column is a RAM element (Ram1 ~Ram5) and can provide only a single time slot every clock cycle because of time-space switch synchronous nature (FIG. 1): the access method is called SW-RR (Sequential Write, Random Read).

From here onwards, we assume that the RAM blocks are dual port R+W and that the same clock frequency is used to read and write the time-slots. A high number of read ports and a read frequency multiple of the write frequency can provide benefit to both this invention and standard architectures to the same extent. However, a description based on the above mentioned assumption may be easier to understand.

If $N_R>1$, then a single data matrix is clearly blocking for any read of more than one time-slot from the same column of the matrix; the switch becomes non-blocking at the level of a single time-slot when the data matrix is replicated. The case $N_R=1$ is outside the scope of this description, because the architecture becomes fully spatial.

In common RAM-based architectures the data for switch connectivity is stored in a data matrix with $N_{CH}$ columns and $N_{TS}$ rows and non-blocking capability is achieved by replicating the data matrix $N_{CH}$ times. For example, as illustrated in FIG. 2, in the case of $N_{CH}=5$ and $N_{TS}=5$, five data matrices (DM21-DM 25) are prepared. Each column of the data matrices (DM21-DM 25) is a RAM element and can provide only a single time slot every clock cycle because of time-space switch synchronous nature. It is worth noting that, if $N_{TS}<N_{CH}$, then $N_{TS}$ replicas are sufficient for non-blocking, but $N_{TS}$ makes the output multiplexing circuitry more complex or even practically unfeasible for $N_{TS}$ as high as 48, which is a common value. Therefore the standard implementation uses $N_{CH}$ replicas of the data matrix. This means that the physical memory size grows with $N_{CH}^2$ which drastically limits the throughput achievable in monolithic form because of the die size and power requirements. Therefore, it is very difficult to reach a switch throughput higher than 200 Gbp/s. For example, in a practical case of a 144×144 2.5 Gb/s (STS-48) grooming switch with STS-1 granularity, $N_{CH}=144$ and $N_{TS}=48$ this standard implementation would require 8 Mbit split into 144 dual port RAMs (or equivalent size of RAMs with higher number of ports).

SUMMARY OF THE INVENTION

In order to provide monolithic switching devices with a higher throughput, a smaller die size and lower power requirements, respectively, this invention provides an architecture and a method of operating of non-blocking time-space synchronous switches, based on specific memory mapping functions, called replica representatives. A non-blocking time and space switch based on the architecture of this invention, comprising a memory core wherein time-slots are sequentially written in a data matrix, characterised in that the data matrix is replicated using more than one replica representative, wherein the replica representative belongs to a set of matrices, obtained by column index permutation of the original data matrix, such that the number of common time-slot of any two columns of different matrices of the set is less than the minimum between the number of rows NR and the number of columns $N_C$ of the matrices.

And also, a method for operating a non-blocking time and space switch, wherein time-slots are sequentially written in a data matrix, characterised in that the data matrix is replicated using more than one replica representative, wherein the replica representative belongs to a set of matrices, obtained by column index permutation of the original data matrix, such that the number of common time-slot of any two columns of different matrices of the set is less than the minimum between the number of rows $N_R$ and the number of columns $N_C$ of the matrices.

The architecture, called LRDR (Low Redundancy Data RAM), and the corresponding method show a much lower data redundancy, in comparison with the common RAM-based approach, as a consequence of a replication built on multiple replica representatives. This makes the LRDR a good candidate for the monolithic implementation of high throughput time-space switches.

BRIEF DESCRIPTION OF THE DRAWINGS

The above and other objects, advantages and features of the present invention will be more apparent from the following description taken in conjunction with the accompanying drawings, in which:

FIG. 5 is a table showing the maximum number of channels using this invention that a non-blocking switch can have for a given number of replicas $N_{RP}$ and a different number $N_T$ of replica representatives $T_n(a_{jk})$. The specific case of one replica representative corresponds to the standard architecture, while LRDR architecture covers all cases of multiple representatives.

DETAIL OF THE INVENTION

In a RAM-based switch the non-blocking capability is achieved with data redundancy which is, at the same time, the primary limiting factor in increasing the switching connectivity.

Figure 1:
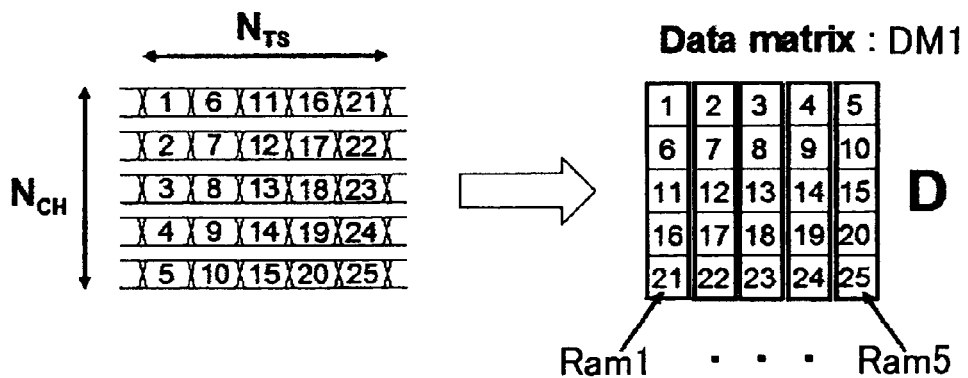
FIG. 1 is an example of a sequential write of time-slots into a single data matrix build with RAMs.
Figure 2:
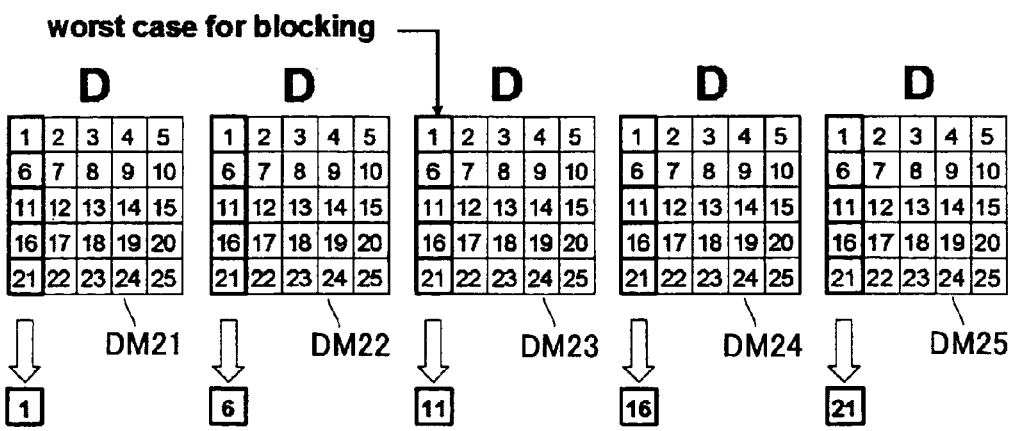
FIG. 2 is an example of five replicas of the same data matrix with $N_{CH}=5$, $N_{TS}=5$ as used in standard RAM-based architecture for a non-blocking switch.
Figure 6:
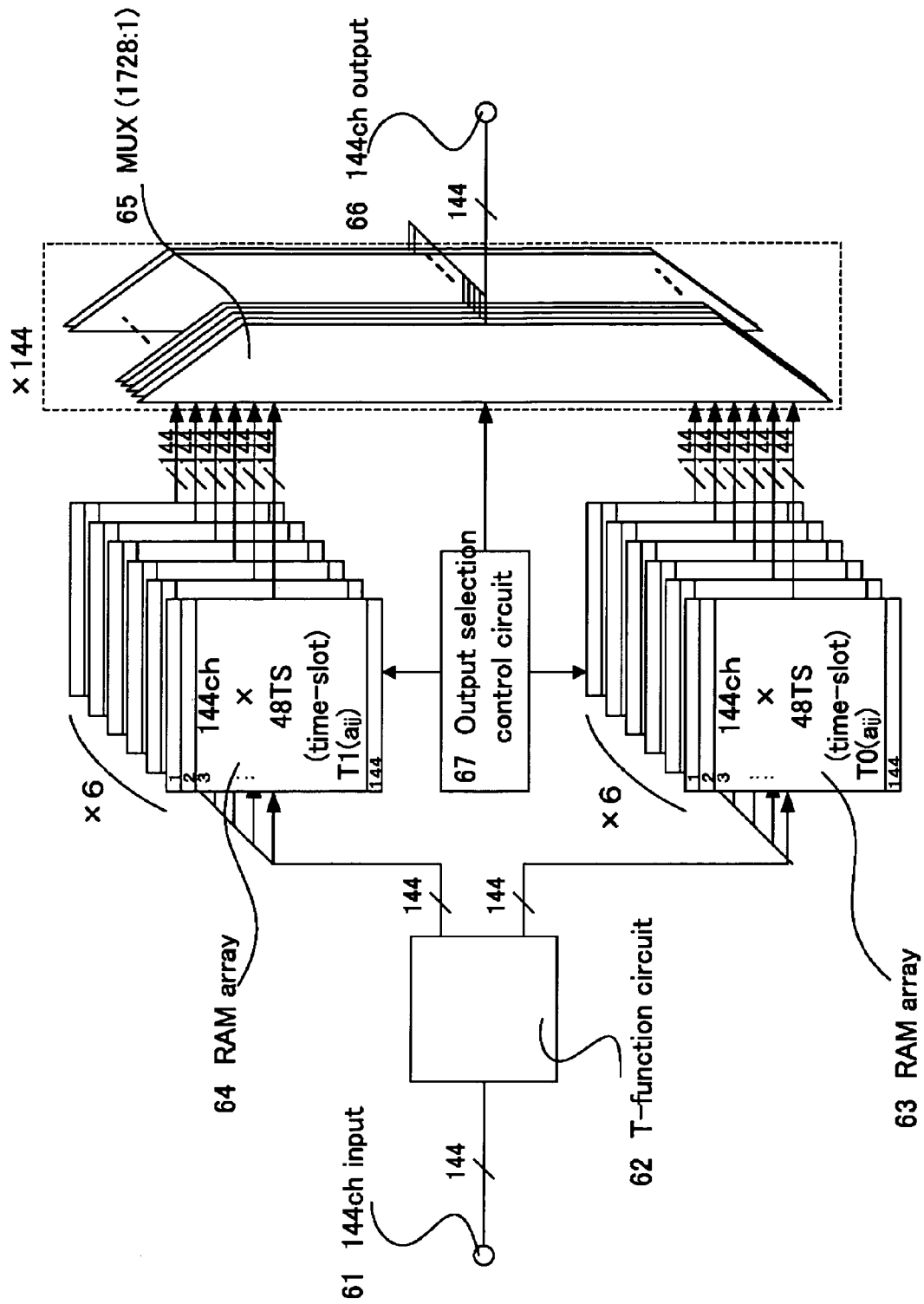
FIG. 6 is an embodiment of this invention.

FIG. 6 is an embodiment of this invention. It shows a 144×144 2.5 Gb/s (STS-48) grooming switch with STS-1 granularity. This switch is comprising 144ch inputs 61, 144ch outputs 66, T-function circuit 62, twelve RAM arrays 63, 64, output selection control circuit 67 and 144 MUXs 65. Each RAM array 63, 64 consists of 144 RAMs and constructs the data matrix. The size of one RAM array is 144ch×48 time-slots. Each RAM array stores input data from 144ch inputs and outputs stored data as selected by the control signal from output selection control circuit 67. The RAM and/or RAM array may include flip-flops and multiplexers. Half of the RAM arrays stores the data with one data matrix $T_0(D)$. The other half of RAM arrays stores the data with another data matrix $T_1(D)$. T-function circuit 62 implements these data matrices in accordance with LRDR architecture. One of the MUX 65 selects the outputs of 12 RAM arrays according to the control signal from the output selection control circuit 67. The output selection control circuit 67 controls both the address of the RAM arrays and the selection of the output MUX. While the LRDR architecture requires only 12 RAM arrays, in the standard approach, illustrated in FIG. 2, 144 RAM arrays are necessary to build the 144×144 2.5 Gb/s (STS-48) grooming switch with STS-1 granularity.

Compared with a standard approach, the LRDR architecture reduces the redundancy for a given number of channels of the switch, but the design internal connections increase, albeit at a much lower level than the mux-based solution. This provides a good balance between memory and routing requirements, making it easier to design high throughput switches.

Figure 3:
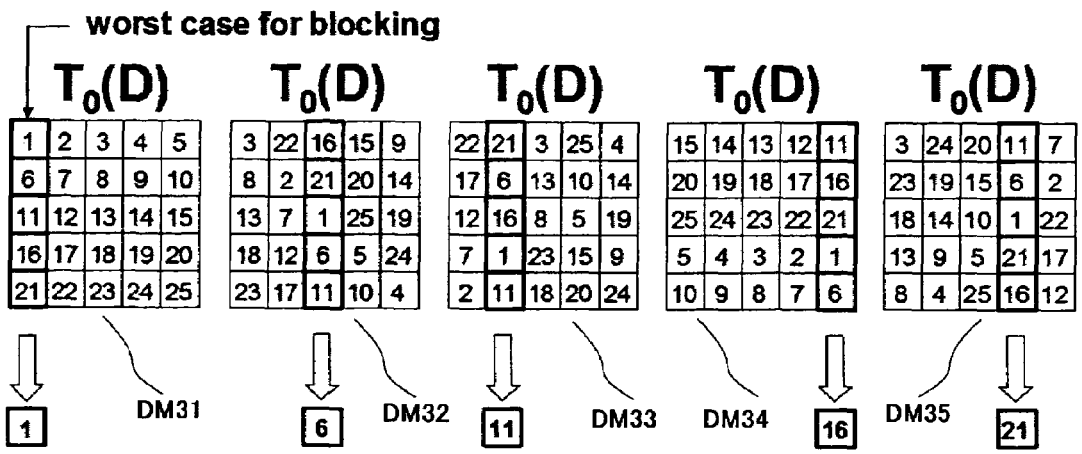
FIG. 3 is an example of five replicas with $N_{CH}=5$, $N_{TS}=5$ with different matrices mappings but with a single replica representative in a non-blocking switch.

First of all, it is important to notice that changing either data position (row index) within the same column or the column order of the data matrix does not influence the non-blocking property of the matrix: in the case of the existence of a set of N time-slots contained in a single column of every replica matrix, where N is equal to the minimum between the number of rows $N_R$ and the number of columns $N_C$ of the data matrix, it is defined that these matrices have the same replica representative. Using different matrices from a set with the same replica representative will not reduce the number of necessary replicas for non-blocking. FIG. 3 shows an example of replica matrices (DM31-DM35) obtained by changing either the position of the data within the same column or the order the columns within the same matrix. This architecture is equivalent to the standard one of FIG. 2: in fact it is still based on a single replica representative $T_0(D)$, because of the existence of a set of 5 time-slots contained in a single column of every replica matrix, and 5 replicas are indeed necessary for non-blocking condition.

The concept of replica representative helps to clearly distinguish the LRDR from the standard architecture: while the standard architecture is based on a single replica representative, the LRDR uses more than one replica representative to reduce the number of required replicas to reach the non-blocking condition.

Figure 4:
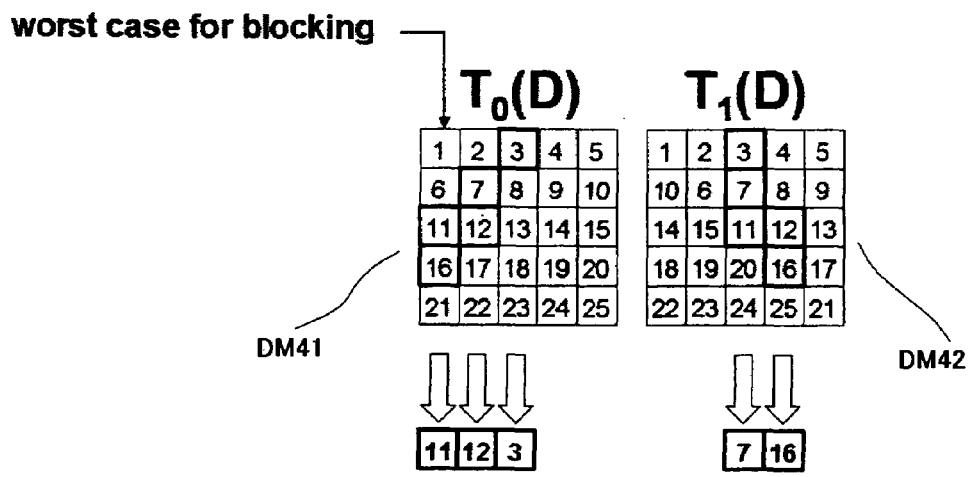
FIG. 4 is an example of this invention, two replicas with $N_{CH}=5$, $N_{TS}=5$ based on two replica representatives $T_0$ and $T_1$ in a non-blocking switch with LRDR architecture.

In this innovative architecture (the LRDR architecture), data matrix is replicated using multiple replica representatives. The number of common time-slot of any two columns of different replica representatives is less than the minimum between the number of rows $N_R$ and the number of columns $N_c$ of the matrices. Namely, any two columns of different replica representatives have a number of common time-slots less than the minimum between the number of rows $N_R$ and the number of columns $N_C$ of the matrices. Preferably, any two columns, belonging to two different replica representatives, have no more than one time-slot in common. FIG. 4 shows an example of two replicas with $N_{CH}=5$, $N_{TS}=5$ based on two replica representatives $T_0(D)$ and $T_1(D)$ in a non-blocking switch with LRDR architecture. Each column of the replicated data matrix (DM41-DM42) is a RAM element and can provide only a single time-slot every clock cycle because of time-space switch synchronous nature. One of the replicated data matrix DM41 is based on replica representatives $T_0(D)$, the other replicated data matrix DM42 is based on replica representatives $T_1(D)$. Non-blocking capability is achieved if any configuration of 5 time-slots can be read in one clock cycle. In case of the standard architecture of FIG. 2 and FIG. 3, 5 replicas are clearly necessary to output a critical configuration like {1, 6, 11, 16, 21} where data belongs to the same column, that is the same RAM element. On the other hand, in case of LRDR architecture the data is replicated differently and it ensures that 2 replicas are sufficient to output critical configuration like the one shown in FIG. 4 {3, 7, 11, 12, 16}. It is worth noting that critical worst case configurations depend on the architecture itself.

The replicated data matrix using multiple replica representatives, defined by the following set of functions $T_n(a_{jk})$:

$$T_n(a_{jk}) \equiv a_{j, (k+n*j) mod(Nc)} \quad (1)$$

$$n = 0 \ldots N_T - 1, j = 0 \ldots N_R - 1, k = 0 \ldots N_C - 1$$

where $a_{jk}$ is the time-slot in the (j, k) position of the data matrix, $N_T$ is the number of replica representatives, $N_R$ is the number of rows of the data matrix, $N_C$ is the number of columns of the data matrix.

$T_n$ defines a cyclic permutation of the column index set $\{0, \ldots, N_C - 1\}$. Among the $N_C$ different permutations $T_n$ defined by the equation (1), only a subset $N_T$ is used to build the replicas of the data matrix.

The number $N_T$ of replica representatives, with indexes $\{n_0, \ldots n_{N_T-1}\}$ satisfy:

$$(j * |n' - n''|) mod(N_C) \neq 0 \quad (2)$$

for any n', n" $\in \{n_0, \ldots n_{N_T-1}\}$, n'≠n" and j=1, ... $N_R$-1.

The condition (2) selects the $T_n$ ($a_{jk}$) functions so that any two columns, belonging to two different replica representatives, have no more than one time-slot in common.

If $N_{CH}/N_{TS} \geq 1$, then the size of the data matrix can be simply $N_C = N_{CH}$ and $N_R = N_{TS}$. Consequently, from condition (2), at least two replica representatives $T_n$ ($a_{jk}$) are available and non-blocking switching is reached with a much lower number of data matrix replicas than the standard RAM-based architecture (FIG. 5) $N_{RP}$ represents the number of replicas. The standard architecture can be seen as the particular case of $N_T=1$ when only one replica representative $T_0(a_{jk})\equiv a_{jk}$ (identity) is used.

LRDR architecture, as already stated, is based on a number of mappings $T_n(a_{jk})$ strictly greater than 1.

It can be demonstrated that for a given number of replicas $N_{RP}$, LRDR architecture is non-blocking for $N_{CH} \leq N_{RP}^2$, whereas for the standard approach it is $N_{CH} \leq N_{RP}$.

LRDR switch shows also an improved dependency of the memory size on the number of channels: for a given $N_{TS}$, the number $N_T$ of functions linearly increases with the number of channels $N_{CH}$. Memory size shows therefore a linear growth with $N_{CH}$.

If $N_{CH}/N_{TS} < 1$, LRDR architecture can be still effectively implemented by storing the incoming data in a data matrix with a proper number of columns $N_C > N_{CH}$ and rows $N_R < N_{TS}$, so that $N_C > N_R$.

In the previously considered example of a 144×144 2.5 Gb/s (STS-48) grooming switch with STS-1 granularity, LRDR implementation, based on two $T_n(a_{jk})$ replica representatives, requires only 648 Kbit of dual port RAMs instead of 8 Mbit. According to the condition (2), four $T_n(a_{jk})$ are available; therefore, the amount of memory can be even further reduced. The LRDR switch requires wider $(N_{RP}*N_{CH})$:1 output muxes, compared to the $N_{CH}$:1 of a standard approach. However $N_{RP}$ is a relatively small number compared to $N_{CH}$. Moreover, memory control design and configuration software for Random Read is less straightforward than standard architecture. In spite of this increase in complexity, the implementation of the LRDR architecture shows an overall advantage in terms of die size and power, which allows the provision of monolithic switches with higher throughput.

It is apparent that the present invention is not limited to the above embodiment, that may be modified and changed without departing from the scope and spirit of the invention.

What I claim is:

1. A non-blocking time and space switch, comprising a memory core wherein time-slots are sequentially written in a data matrix,
   wherein the data matrix is replicated using more than one replica representative, and
   wherein a replica representative belongs to a set of matrices, obtained by a column index permutation of the original data matrix, such that a number of common time-slots of any two columns of different matrices of the set is less than a minimum between a number of rows $N_R$ and a number of columns $N_C$ of the matrices.

2. A non-blocking time and space switch according to claim 1, wherein any two columns, belonging to any different replica representatives, have no more than one time-slot in common.

3. A non-blocking time and space switch according to claim 1, wherein the replica representatives are defined by the set of functions $$T_n(a_{jk}) \equiv a_{j,(k+n*j) mod(Nc)}$$

$$n=0 \ldots N_T-1, j=0 \ldots N_R-1, k=0 \ldots N_C-1$$

where $a_{jk}$ is the time slot in the (j, k) position of the data matrix,
$N_T$ is the number of replica representatives,
$N_R$ is the number of rows of the data matrix,
$N_C$ is the number of columns of the data matrix.

4. A non-blocking time and space switch according to claim 2, wherein the replica representatives are defined by the set of functions $$T_n(a_{jk}) \equiv a_{j,(k+n*j) mod(Nc)}$$

$$n=0 \ldots N_T-1, j=0 \ldots N_R-1, k=0 \ldots N_C-1$$

where $a_{jk}$ is the time slot in the (j, k) position of the data matrix,
$N_T$ is the number of replica representatives,
$N_R$ is the number of rows of the data matrix,
$N_C$ is the number of columns of the data matrix.

5. A non-blocking time and space switch according to claim 3, wherein the number $N_T$ of replica representatives, with indexes $\{n_0, \ldots n_{NT-1}\}$, is limited by $$(j*|n'-n''|) mod(N_C) \neq 0$$

for any n', n'' ∈ $\{n_0, \ldots n_{NT-1}\}$, n'≠n'' and j=1, ... $N_R$-1

6. A non-blocking time and space switch according to claim 4, wherein the number $N_T$ of replica representatives, with indexes $\{n_0, \ldots n_{NT-1}\}$, is limited by $$(j*|n'-n''|) mod(N_C) \neq 0$$

for any n', n'' ∈ $\{n_0, \ldots n_{NT-1}\}$, n'≠n'' and j=1, ... $N_R$-1.

7. A non-blocking time and space switch according to claim 1, wherein the memory core comprises RAMs having two or more ports.

8. A non-blocking time and space switch according to claim 2, wherein the memory core comprises RAMs having two or more ports.

9. A non-blocking time and space switch according to claim 3, wherein the memory core comprises RAMs having two or more ports.

10. A non-blocking time and space switch according to claim 4, wherein the memory core comprises RAMs having two or more ports.

11. A non-blocking time and space switch according to claim 5, wherein the memory core comprises RAMs having two or more ports.

12. A non-blocking time and space switch according to claim 6, wherein the memory core comprises RAMs having two or more ports.

13. A non-blocking time and space switch according to claim 1, wherein the memory core comprises flip-flops and multiplexers.

14. A method for operating a non-blocking time and space switch, wherein time-slots are sequentially written in a data matrix, said method comprising:
   replicating the data matrix using more than one replica representative,
   wherein the replica representative belongs to a set of matrices, obtained by a column index permutation of the original data matrix, such that a number of common time-slots of any two columns of different matrices of the set is less than a minimum between a number of rows $N_R$ and a number of columns $N_C$ of the matrices.

15. A method for operating a non-blocking time and space switch according to claim 14, wherein any two columns, belonging to any different replica representatives, have no more than one time-slot in common.

16. A method for operating a non-blocking time and space switch according to claim 14, wherein the replica representatives are defined by the set of functions $$T_n(a_{jk}) \equiv a_{j,(k+n*j) mod(Nc)}$$

$$n=0 \ldots N_T-1, j=0 \ldots N_R-1, k=0 \ldots N_C-1$$

where $a_{jk}$ is the time slot in the (j, k) position of the data matrix,
$N_T$ is the number of replica representatives,
$N_R$ is the number of rows of the data matrix,
$N_C$ is the number of columns of the data matrix.

17. A method for operating a non-blocking time and space switch according to claim 15, wherein the replica representatives are defined by the set of functions $$T_n(a_{jk}) \equiv a_{j,(k+n*j) mod(Nc)}$$

$$n=0 \ldots N_T-1, j=0 \ldots N_R-1, k=0 \ldots N_C-1$$

where $a_{jk}$ is the time slot in the (j, k) position of the data matrix,
$N_T$ is the number of replica representatives,
$N_R$ is the number of rows of the data matrix,
$N_C$ is the number of columns of the data matrix.

18. A method for operating a non-blocking time and space switch according to claim 16, wherein the number $N_T$ of replica representatives, with indexes $\{n_0, \ldots n_{NT-1}\}$, is limited by $$(j*|n'-n''|) mod(N_C) \neq 0$$

for any n', n'' ∈ $\{n_0, \ldots n_{NT-1}\}$, n'≠n'' and j=1, ... $N_R$-1.

19. A method for operating a non-blocking time and space switch according to claim 17, wherein the number $N_T$ of replica representatives, with indexes $\{n_0, \ldots n_{NT-1}\}$, is limited by $$(j*|n'-n''|) mod(N_C) \neq 0$$

for any n', n'' ∈ $\{n_0, \ldots n_{NT-1}\}$, n'≠n'' and j=1, ... $N_R$-1.

* * * * *